3,767,586
PROCESS FOR PREPARING STABLE AQUEOUS SOLUTIONS OF N-HALO COMPOUNDS
Andrew F. Rutkiewic, West Chester, Pa., assignor to E. I. du Pont de Nemours and Company, Wilmington, Del.
No Drawing. Continuation-in-part of application Ser. No. 6,539, Jan. 28, 1970, which is a continuation-in-part of application Ser. No. 745,111, July 16, 1968, both now abandoned. This application Sept. 10, 1971, Ser. No. 179,593
Int. Cl. C01b *21/52;* D21c *3/18*
U.S. Cl. 252—187 H        8 Claims

ABSTRACT OF THE DISCLOSURE

A process for preparing stable concentrated aqueous solutions of N-halo compounds, in which water, an N-hydrogen compound, a halogen ($Br_2$, $Cl_2$ or $I_2$) an alkali or alkaline earth hydroxide, and a buffering compound are added to and mixed in a reaction vessel. The buffer establishes and maintains a pH in the range of 4.5 to 8.5, thereby preventing rapid decomposition of the N-halo compounds which occurs under extreme acid or alkaline conditions. The solutions are useful as household and industrial bleaches, as slimicides, and for other purposes.

CROSS REFERENCE TO RELATED APPLICATIONS

This application is a continuation-in-part of application Ser. No. 6,539 filed Jan. 28, 1970, now abandoned which was in turn a continuation-in-part of application Ser. No. 745,111, filed July 16, 1968, now abandoned.

BACKGROUND OF THE INVENTION

Field of the invention

This invention concerns a process for preparing stable solutions of N-halo compounds by reaction of N-hydrogen compounds with elemental halogen in presence of hydroxides.

Prior art

It is known to react N-hydrogen compounds with hypohalite to produce N-halo compounds. For example, solutions of N-chlorosulfamic acids have been made by reacting sulfamic acid with chlorine water or an alkali or alkaline earth metal hypochlorite. See Self et al. U.S. 3,328,294, and Larsen U.S. 3,177,111.

While the art does teach the reaction of sulfamic acid and a hypochlorite these teachings are related to dilute bleaching solutions which are used immediately upon mixing. The prior art does not teach or recognize that in order to prepare stable concentrated solutions of sulfamic acid and a hypochlorite the pH of the solution must be controlled. Without pH control a concentrated solution will decompose rapidly on standing.

SUMMARY OF THE INVENTION

This invention is a process for making stable aqueous 0.001 to 1 molar solutions of N-halo compounds by mixing and reacting an N-hydrogen compound with an alkali or alkaline earth metal hydroxide and a halogen in the presence of a buffer to maintain the pH of the reaction between 4.5 and 8.5.

Among the advantages of this process are ease of pH control at relatively constant levels during the reaction and avoiding the isolation of a source of hypochlorite ion prior to reaction.

As used in this invention the term N-hydrogen compound means a Bronsted acid amide which contains at least 1 N—H bond. That is, N-hydrogen compounds are those having an N—H or $NH_2$ group adjacent to an electron withdrawing functional group such as C=O, S=O or P=O. In this invention N-hydrogen compounds are limited to those having a dissociation contant ($pK_b$) greater than 5 with the proviso that the conjugate base of the Bronsted acid is not halogen or halogen oxide. Examples are below:

| Acid | Acid amide derivative |
| --- | --- |
| Hydrogen cyanide | Cyanamide. |
| Do | Dicyandiamide. |
| Do | Melamine. |
| Carbonic acid | Ethyl carbamate. |
| Do | Urea. |
| Do | Thiourea. |
| Do | 1,3-dimethylbiuret. |
| Do | Methyl phenylbiuret. |
| Do | Isocyanuric acid. |
| Do | Barbituric acid. |
| Do | 6-methyluracil. |
| Do | 2-imidazolinone. |
| Do | Uron. |
| Do | 5,5 dimethylhydantoin. |
| Do | Ethyleneurea. |
| Do | 2-pyrimidinone. |
| Carboxylic acids | Benzamide. |
| Do | Phthalimide. |
| Do | n-Ethylacetamide. |
| Amino acids | Azetidin-2-one. |
| Do | 2-pyrrolidone. |
| Do | Caprolactam. |
| Sulfuric acid | Sulfamic acid. |
| Do | Sulfamide. |
| Do | p-Toluenesulfonamide. |
| Do | Phenyl sulfinimide. |
| Do | Phenyl sulfinimidylamide. |
| Do | Diphenyl sulfonimide. |
| Do | Dimethyl sulfinimine. |
| Do | Isothiazolene-1,1-dioxide. |
| Phosphoric acid | Orthophosphoryl triamide. |
| Do | Pyrophosphoryl triamide. |
| Do | Phenyl phosphoryl-bisdimethylamide. |
| Boric acid | Boric acid amide. |

The preferred N-hydrogen compound is sulfamic acid.

As used in this invention the term buffer is defined as a weak acid ($pK_a=4-13$) and its conjugate base (alkali metal or alkaline earth metal salt of the weak acid). These would be exemplified as acetic acid and acetate salts, boric acid and borate salts, arsenous acid and arsenate salts, carbonic acid and carbonate salts, phosphoric acids and phosphate salts, and silicic acids and silicate salts. The particular buffer or combination of buffers will depend upon the pH desired and the solubility requirements. The amount of buffer used should exceed 10 mole percent of the N-halo compound in the system.

The alkali or alkaline earth hydroxides which are preferred are sodium, potassium, and lithium hydroxides.

DECRIPTION OF THE PREFERRED EMBODIMENT

The presently preferred embodiment of this invention is a process for directly preparing a stable aqueous solution of N,N-dichlorosulfamic acid from chlorine, sodium or potassium hydroxide, sulfamic acid, and a buffering agent. Solutions prepared by this process are outstanding as bleaches, providing an unusual balance between bleaching efficiency and safety. For example, the solutions provide stain removal efficiency which approaches that of strong hypochlorite bleaches, and fabric and dye safety close to that of oxygen bleaches. The solutions are also useful for controlling microorganisms. For example, they can be used as slimicides in papermaking processes, water cooling towers, and the like.

In aqueous solution, N,N-dichlorosulfamic acid reacts with hydroxide ion to provide hypochlorite ion and sulfamic acid. The reaction is reversible. Thus, at equilibrium, there is always some hypochlorite ion (active chlorine) present in the solutions. This accounts for usefulness of the solutions as bleaches, slimicides, etc. As the hypochlorite ion is depleted in use, more hypochlorite is formed by reaction of N,N-dichlorosulfamic acid and hydroxide ions. Thus, the solutions are useful wherever a gradual release of hypochlorite ion is desired.

In aqueous solution, N,N-dichlorosulfamic acid decomposes. The decomposition products are acid. Thus, as decomposition proceeds, solutions of N,N-dichlorosulfamic acid become increasingly acid. When pH of about 4 is reached, decomposition accelerates markedly. Consequently, unbuffered solutions of N,N-dichlorosulfamic acid must be used shortly after preparation. The buffered solutions made by this invention, however, can be shipped and/or stored for substantial periods of time after preparation. N,N-dichlorosulfamic acid also decomposes rapidly in highly alkaline solution. A further purpose of the buffer, therefore, is to avoid highly alkaline conditions in the system during the process of this invention.

In the process of this invention, stability of the resulting solutions of N,N-dichlorosulfamic acid is dependent upon molar ratios of reactants as well as pH. Hypochlorite ion is probably formed in situ and reacted immediately with the sulfamic acid. In Table I the effect of controlling the mole ratio of in situ hypochlorite ion to sulfamate ion on stability is shown. The stability of the compositions is reported in terms of loss of active chlorine (expressed as "percent active oxygen," which is defined as the equivalents of iodine released from potassium iodide, per gram of sample, multiplied by 1.0 times the equivalent weight of oxygen).

TABLE I

Effect of mole ratio on stability

| Mole ratio $(OCl^-/SO_3NH_2^-)$: | Percent of initial active oxygen after 12 days |
|---|---|
| 1.75 | 88.5 |
| 2.00 | 92.5 |
| 2.25 | 82.5 |
| 2.50 | 68.5 |
| 2.75 | 57.5 |
| 3.00 | 37.5 |

In order to achieve high stability, therefore, one mole of sulfamate ion is reacted with two moles each of hydroxide ion and chlorine so as to assure a 2.0 to 1.0 mole ratio of in situ hypochlorite ion to sulfamate ion. It is understood, however, that somewhat less stable compositions can be obtained by changing the preferred 2 to 1 mole ratio of in situ hypochlorite ion to sulfamate ion. In addition, as the pH range of the reaction system is varied, stable compositions may be prepared at different mole ratios of in situ hypochlorite to sulfamate.

The buffering compounds can be added to the reaction system in at least two ways. In a single buffer system, all of the buffering compound is normally added to the reaction vessel after the addition of aqueous sulfamic acid. In a two buffer system, such as an acetic and sodium bicarbonate system, acetic acid is usually added to the aqueous sulfamic acid solution first while sodium bicarbonate is added after the initial addition of the hydroxide ion in order to avoid decomposition of the bicarbonate at pH levels below 7.0.

Normally, an aqueous sulfamic acid solution is first added to the reaction vessel. Then a suitable buffering compound and hydroxide ion are added to neutralize the acid and aid in the pH control of the reaction system. Finally, chlorine and hydroxide ion are added to the reaction vessel simultaneously and continuously to carry out the reaction at a relatively constant pH. Actual control of the reaction pH is normally carried out by regulating the flow of hydroxide ion to the reaction vessel.

The range of reaction pH which is maintained to produce stable compositions is about 4.5 to 8.5. The particular buffer selected for use in the process of this invention, and the amount of buffer used, therefore, depends upon the amount of acid produced by decomposition of the N,N-dichlorosulfamate. Sufficient buffer is added to take up most or all of the acid produced.

Hydroxide ion is added to the reaction vessel at a rate sufficient to maintain a reaction pH for the resultant mixture at about between 4.5 to 8.5 when phosphate buffers are used. Under normal reaction conditions, the pH is preferably controlled at about 6.5. When other buffers are used, other preferred pH conditions are sometimes maintained.

The process is normally carried out in jacketed, agitated glass reactors at atmospheric pressure. In addition, the temperature range at which the reaction is carried out is about 15 to 20° C. Although higher temperatures can be used, decomposition of N,N-dichlorosulfamate compositions sometimes results at reaction temperatures above 40° C. When using Br or I in place of Cl, yields are improved by lowering the temperature well below ambient, e.g. down to 0° C.

In using N-hydrogen compounds other than sulfamic acid the stoichiometric quantity required to react with approximately 1 mole per liter of in situ hypochlorite is used. Table II illustrates the preferred mole ratios of in situ hypochlorite to N-hydrogen compound necessary to produce compositions having maximum stability.

TABLE II

Mole ratio of in situ hypochlorite to N-hydrogen compound

| | Mole ratio |
|---|---|
| Sulfamic acid | 2 |
| Sulfamide | 4 |
| Trisulfamide | 3 |
| Para-toluenesulfamide | 2 |
| Melamine | 6 |
| Sodium triamidometaphosphate | 3 |
| 3,3-dimethyl hydantoin | 2 |

Example I

A solution of N,N-dichlorosulfamate was prepared by mixing and dissolving 800 parts water, 52.5 parts sulfamic acid, and 92.5 parts phosphoric acid precursor in a jacketed 2000 ml. glass vessel equipped with an agitator, pH measuring device, and thermometer. Next 227.4 parts of a 45% by weight aqueous potassium hydroxide solution was added to the reaction vessel and mixed with the aqueous sulfamic acid solution to bring the pH of the mixture to about 6.5. The mixture was then cooled to 15° C. by passing chilled water through the vessel jacket after which time chlorine was bubbled into the mixture at a rate of 1 part per minute. While chlorine was being added to the vessel, 45% potassium hydroxide was added to maintain a reaction pH of 6.5. During the addition steps, the reaction temperature was controlled between 15 to 20° C. by running chilled water through the vessel jacket. After all the chlorine was added, additional 45% potassium hydroxide was added to the reaction mixture to adjust the final pH to 10. The total amount of 45% potassium hydroxide added during the chlorine addition and to adjust the pH to 10 was 200 parts. The total amount of chlorine added was 77 parts. Finally, 50.6 parts of water was mixed with the reaction product to yield a total of 1500 parts of the N,N-dichlorosulfamate composition. The stability of the composition as measured by percent active oxygen was 1.13 and the pH of the composition was 10. After six months of storage the composition prepared by this procedure had 1.08 percent active oxygen at a pH of 8.0.

Example II

A solution of N,N-dichlorosulfamate was prepared by mixing and dissolving 800 parts water, 52.5 parts sulfamic acid and 32.5 parts acetic acid in the reaction vessel described in Example I. Next, 12.3 parts of a 25% by weight aqueous solution of sodium hydroxide was added to the reaction vessel and mixed with the aqueous sulfamic acid-acetic acid solution until the pH of the solution was about 4.5. The mixture was then cooled to 15° C. by passing chilled water through the vessel jacket after which time chlorine was bubbled into the mixture at a rate of 1 part per minute. While 77 parts of the chlorine was being added, 165 parts of the 25% aqueous solution of sodium hydroxide was continuously added to maintain a reaction pH of 4.5. During the addition steps, the reaction temperature was controlled between 15 to 20° C. by running chilled water through the vessel jacket. After all the chlorine was added, 60 parts of the 25% aqueous solution of sodium hydroxide was added to the reaction mixture to raise the pH of the solution to about 7.5 to avoid bicarbonate decomposition. Then 55.5 parts of solid sodium bicarbonate was mixed with the reaction solution, and 40 parts of the 25% sodium hydroxide solution was added to adjust the pH of the composition to about 9.2. Finally, 44.5 parts of water was added to the reaction product to yield a total of 1500 parts of the N,N-dichlorosulfamate solution. The stability of the solution as measured by percent active oxygen was 1.16 and the pH was 9.2. After storage for three months, the composition had 1.06 percent active oxygen and a pH of 8.8.

Example III

A solution of a carbonate buffered N,N-dichlorosulfamate was prepared by mixing and dissolving 600 parts water and 75 parts sodium sesquicarbonate in the reaction vessel of Example I. Next, 400 parts water and 52.5 parts sulfamic acid was first separately mixed and dissolved and then added to the reaction vessel. The pH of the combined solution was adjusted to about 8.0 by adding 35 parts of a 25% by weight solution of aqueous sodium hydroxide to the reaction vessel. Then the mixture was cooled to 15° C. after which chlorine and the 25 percent solution of sodium hydroxide were added simultaneously and continuously to control the reaction pH between 8.0 and 8.5. During this addition step, the reaction temperature was controlled between 15 to 20° C., the amount of chlorine added was 77 parts (at a rate of 1 part per minute) and the amount of 25 percent sodium hydroxide solution added was 130 parts. Finally, 130.5 parts of water was added to the reaction vessel to yield a total of 1500 parts of the N,N-dichlorosulfamate solution. The stability of the resultant solution as measured by percent active oxygen was 1.16 and the pH was 9.2. After storage for three months the composition had 1.02 percent active oxygen and a pH of 9.1.

I claim:

1. A process for preparing stable aqueous 0.001 to 1.0 molar solutions of N-halo compounds comprising mixing and reacting an N-hydrogen compound which is a Bronsted acid amide having a dissociation constant greater than 5 with the proviso that the conjugate base of the Bronsted acid is not halogen or halogen oxide, an alkali or alkaline earth metal hydroxide, and a halogen selected from Br, Cl, and I, in the presence of a weak acid having a $pK_a$ of 4-13 or the conjugate base thereof as a buffering agent to maintain the reaction pH between 4.5 and 8.5.

2. Process of claim 1 wherein the N-hydrogen compound contains NH or $NH_2$ groups which are acid-reacting.

3. Process of claim 2 in which the buffering agent is an alkali metal or alkaline earth metal acetate, carbonate, phosphate, polyphosphate, borate, polyborate, silicate, polysilicate, or organosilicate, or a combination of any two or more of these.

4. Process of claim 3 in which the hydroxide is selected from sodium and potassium hydroxides.

5. Process of claim 4 in which the N-hydrogen compound is sulfamic acid and the halogen is chlorine.

6. Process of claim 5 in which pH is maintained at about 6.5.

7. Process of claim 1 in which the N-hydrogen compound is cyanamide, dicyandiamide, melamine, ethyl carbamate, urea, thiourea, 1,3-dimethylbiuret, methyl phenylbiuret, isocyanuric acid, barbituric acid, 6-methyluracil, 2-imidazolinone, uron, 5,5-dimethylhydantoin, ethyleneurea, 2-pyrimidinone, benzamide, phthalimide, n-ethylacetamide, azetidin-2-one, 2-pyrrolidone, caprolactam, sulfamic acid, sulfamide, p-toluenesulfonamide, phenyl sulfinimide, phenyl, sulfinimidylamide, diphenyl sulfonimide, dimethyl sulfinimine, isothiazolene-1,1-dioxide, orthophosphoryl triamide, pyrophosphoryl triamide, phenyl phosphoryl-bis dimethylamide, boric acid amide, trisulfamide, sodium triamidometaphosphate or 3,3-dimethylhydantoin.

8. Process of claim 1 in which the buffering agent is acetic acid, boric acid, arsenous acid, carbonic acid, phosphoric acids and silicic acids.

References Cited

UNITED STATES PATENTS

| 3,177,111 | 4/1965 | Larsen | 162—73 |
| 3,170,883 | 2/1965 | Owen et al. | 252—187 |
| 3,461,202 | 8/1969 | Robson et al. | 252—187 |

OTHER REFERENCES

Deming, H. G., "Fundamental Chemistry," 1940, J. Wiley & Sons, p. 251.

MAYER WEINBLATT, Primary Examiner

I. GLUCK, Assistant Examiner

U.S. Cl. X.R.

8—109; 162—73, 89; 252—102; 423—413